July 15, 1930.    A. A. ROBERTS    1,770,627
METHOD AND PROCESS OF PRODUCING FUEL TO SELECTED
SPECIFICATIONS AND THE PRODUCT THEREOF
Filed June 28, 1929    4 Sheets-Sheet 1

Inventor
Arthur A. Roberts
By Thos. Q. Lanning
Attorney

July 15, 1930.  A. A. ROBERTS  1,770,627
METHOD AND PROCESS OF PRODUCING FUEL TO SELECTED
SPECIFICATIONS AND THE PRODUCT THEREOF
Filed June 28, 1929  4 Sheets-Sheet 4

Inventor
Arthur A. Roberts
By Thos. A. Banning Jr.
Attorney

Patented July 15, 1930

1,770,627

UNITED STATES PATENT OFFICE

ARTHUR A. ROBERTS, OF CHICAGO, ILLINOIS

METHOD AND PROCESS OF PRODUCING FUEL TO SELECTED SPECIFICATIONS AND THE PRODUCT THEREOF

Application filed June 28, 1929. Serial No. 374,324.

This invention has to do with improvements in methods of producing new and improved artificial carbonaceous fuels and also has to do with the fuel itself as an improved article of manufacture. The fuel produced by this method is composed mainly of solid carbonaceous materials; and in the practice of the invention, there may or may not be present substantial quantities of other combustible materials in the form of hydrocarbons such as undistilled volatile constituents of coal, peat, lignite, sawdust, tanbark, and other raw materials, depending upon the raw materials used and the treatment to which they are subjected.

In practicing the method and process herein disclosed for the production of a desired artificial fuel, a wide variety of carbonaceous materials may be used. These include substantially any of the well-known and accessible carbonaceous materials, such as sawdust, tan-bark, peat, lignite, sub-bituminous coal, bituminous coal, anthracite, and other raw carbonaceous materials; as well as carbonaceous materials which have been subjected to previous distilling processes such as coke, charcoal, petroleum coke, and other similar materials.

In the practice of my present invention, I am able to produce artificial carbonaceous fuels to selected and predetermined physical characteristics and specifications within a very wide range of specifications of density, porosity, hardness, toughness, and size and shape of pieces; besides which, I am able to control the characteristics of the fuel in such manner as to conform to a wide variation of specifications of rate of combustion, intensity of combustion, and intensity of heat energy released under given conditions of draft and air supply, and size and depth of fire box. I am also able to produce fuels within a wide variation of specifications of mineral content so as to adapt them to use under different conditions and operations and for many different purposes. The variations of physical properties, mineral contents, and retarded or accelerated combustible qualities make it possible to provide a fuel capable of producing the highest efficiency and greatest economy under any given conditions wherever it is necessary or desired to use a fuel.

Generally speaking, the artificial fuels produced by my invention are formed by the joining together of particles of carbonaceous material which are amalgamated and cemented or bonded together under the application of pressure and other controlled conditions of operation. The required pressure, proper fineness of base crystals, necessary bonding material, requisite moisture, angle of pressure, hydrostatic release of air and gas from the mould and given time of operating application to bring together all elements to the desired point of application on the fuel base to make from the same a monolithic block of predetermined physical and combustion specifications and requirements as may be desired or necessary in any particular use of fuel, must be considered. By the application of my method, I am able to successfully produce artificial fuels within a very wide range of characteristics already referred to and out of the wide selection of raw materials. Inasmuch as numerous methods of manufacture of artificial fuels have been devised and practiced in the past, I shall refer to and explain certain of the fundamental conditions which I have discovered as definitely affecting the characteristics of artificial fuels, and I will then explain more in detail how I am able to control these factors and subject the materials to the proper and controlled conditions in order to produce the artificial fuel to the desired specifications.

I will state in the first place, that there are certain and well defined physical and chemical conditions which must be obtained in related proportions to produce a specified fuel as to physical characteristics and controlled or predetermined rate of combustion or intensity of heat energy released. These conditions include carbonaceous materials, required amount of air to provide the necessary mixture of oxygen and combustible elements, a temperature above the ignition point of the combustible elements in the fuel, and the hardness, density or porosity of the fuel. These elements and other characteristics to be disclosed herein must be related in the method and manner to bring about a combination which, when used in the act of combustion, determines the intensity of heat energy released, and gives an accelerated or retarded rate of combustion, and determines the life of the fuel, and surface combustion, and elimination of smoke. The intensity of combustion or release of heat energy largely depends upon the intimacy of mixture and rapidity of mixture of air with the combustible elements; and the variation of physical and chemical qualities of a fuel when subjected to a temperature above the kindling point in a large degree affects the desirability, efficiency and economy of the fuel thus used.

The aggregation of the carbonaceous material into a homogeneous structure which can be successfully used for the combustion purposes intended requires as one of the factors of the process the presence of a suitable binder for binding the particles together. This is true largely irrespective of the amount of compression to which the material may have been subjected since in the absence of such a binding medium, the particles will not continue to cohere under the stringent conditions of shock and pressure and the other disintegrating influences of storage and handling and shipment; and neither will said particles maintain their proper coherence during combustion unless the binder is present and is of such a nature and characteristics as to properly perform its functions under the conditions of combustion or temperature to which it is or may be subjected during all or a part of the period of combustion. This of necessity covers a wide variation inasmuch as the crystal formation of various carbonaceous materials require bonds of different proportions and mixtures.

From above, it will be seen that a suitable bonding medium must be done which will properly perform its functions when the fuel is subjected to the rough and disintegrating influences of moisture and the elements; and also under the combustion conditions existing in the furnace or other place of consumption. These conditions include the temperature which may be created in the combustion and which may be extremely elevated, and also include the use of a forced or high pressure draft, or the lack of draft as the case may be and also include the pressure of the superincumbent mass of the fuel or other materials which may be used or may be present in the furnace, stack, or other place of combustion.

In addition to the foregoing, the fuel, in order to be successful and to find wide application and usefulness in ends and heating purposes generally, must be of such a nature that it will not support or permit of self-ignition or spontaneous combustion, and that it will not be chemically or otherwise injurious to the containers and storage bins in which it is contained and shipped, and must be of such a nature that during combustion, it will not create or give off gases, fumes, or tarry substances of a corroding, injurious, or deterrent nature or which will tend to deposit upon and within and clog up passages and flues through which the drafts must be maintained and will not deposit insulating layers on the surfaces of the walls through which the heat must be conducted.

The raw carbonaceous materials contain in themselves bonding mineral ingredients which possess the ability to bond or bind together the particles of carbonaceous material provided they are subjected to the proper treatment under the proper conditions. The amount of such bonding mineral ingredients present differs in different kinds of raw materials; and a given percentage of such ingredients may in the case of certain kinds of raw materials be more effective and advantageous than in the case of others. Generally speaking, the bonding mineral ingredients are those portions of the mineral ash classified as aluminates and silicates, and of these, the aluminates are the more beneficial for bonding purposes. In many cases, the amount of such bonding mineral ingredients naturally present is insufficient to produce the necessary and desired amount of bonding action for the production of an artificial fuel of desired hardness. In such cases, such insufficiency may be overcome and compensated for by the addition of a suitable and proper percentage of an artificial mineral bonding agent. The presence of the mineral bonding ingredients, whether naturally present or artificially added, necessarily results in a retarding action in so far as the combustion is concerned, so that to secure at all times a desirable combustion reaction, the process of manufacture must make provision to otherwise compensate for such retardation and also to even accelerate the combustion if and when such acceleration is desired or found to be more efficient and economical in application and amount of heat energy released.

The density of the artificial fuel is determined, among other things, by the amount of compression to which it is subjected during manufacture since this compression necessarily results in closing and reducing the size of the pores or voids to an extent corresponding somewhat to the amount of such compression. The reduction of porosity corresponding to such increase of density occasioned by the compressive action likewise tends to retard the combustibility of the fuel. This retarding action, however, is in some respects of a beneficial nature since it compels the combustion to proceed entirely from the surface of the fuel blocks, and thus promotes a more regular and better controlled combustion action.

Furthermore, the increase of hardness and density already referred to are desirable from the standpoint of producing a fuel which is capable of maintaining its form and shape not only during storage and handling and shipment, but also during the combustion operation; and also serve to reduce the friability and loss of fuel and interference to combustion caused by chipping and disintegration.

I have discovered the fact that there is a class of chemicals which possess the faculty or ability to promote the chemical affinity and activity of oxygen or air and carbonaceous material under the influence of heat so that such chemicals are able to accelerate or promote the combustion as compared with what it would have been in case such accelerator had not been present or used. Magnesium chloride ($MgCl_2.6H_2O$) is an excellent example of such chemical or material. I shall hereinafter refer to the same in the further disclosure of my method and process, but in so doing I do not intend to limit myself to this chemical or accelerator except as I may do so in the claims.

I have discovered the fact that the use of such chemical or accelerator which I have illustrated by magnesium chloride in properly controlled proportions and under proper conditions as related to the other factors and conditions of manufacturing the fuel, makes it possible to produce an artificial fuel in which the objectional influences of the bonding mineral ingredients may be either fully or partially or more than fully overcome, and in which in like manner, the effect of compression may be fully or partially or more than fully compensated for; so that it is possible according to my method and process to produce artificial fuels in which the combustibility is either partially or fully restored or even accelerated and improved as compared to what it would have been in the case of such percent of bonding mineral ingredients and compression, had such chemical or accelerator not been used. More especially, I have discovered that I am able to fully or partially or more than fully compensate for the combustion retarding action of any bonding mineral artificially added to the mixture, so that the features of my discovery and invention are especially valuable and advantageous in those cases where experience demonstrates that there is not sufficient bonding mineral ingredient in the raw carbonaceous material so that it is desirable or necessary to artificially increase the amount of such bonding mineral ingredients by addition of suitable agglutinating material to the mixture. Likewise I am able to compensate for the combustion retarding effect of bonding mineral ingredient naturally present in excessive amount.

Generally speaking, the percent of accelerating chemical which should be added to the raw material to produce a particular or specific fuel is related to the percent of other agglutinating mineral ingredients in the raw carbonaceous material or that is added thereto, and increases as the percent of such agglutinating mineral ingredients increases. This law of relationship is dependent upon the total percent of the bonding mineral ingredients present in the material including any bonding minerals artifically added thereto; and is a fixed relationship for any given "combustion factor". That is to say, if the rate of combustion or intensity of liberation of heat units is to be maintained at a given amount, the percentage of accelerator to be added to the material should be increased as the percentage of the bonding mineral ingredients is increased. Likewise, for any given percentage of bonding mineral ingredients present, whether naturally present or artificially added, the rate of combustion will vary according to variation of the percentage of accelerator added to the material so that I have discovered that it is possible to control the combustion rate by regulation of the percentage of accelerator in proper relationship to the other factors.

Inasmuch as the toughness and hardness of the artificial fuel depends, among other things, upon the percentage of bonding mineral ingredients used in the mixture, I have found that it is possible to manufacture the artificial fuel to whatever toughness and hardness may be selected or specified by merely artificially adding to the raw material such amount of bonding mineral as may be necessary to bring the total combined percentage of bonding minerals up to that amount necessary for the specified toughness and hardness. Having done so, the combustibility of the fuel will have been correspondingly affected since I have already shown that the increase of bonding mineral ingredients lowers or reduces the rate of combustion, which should and can be compensated for with but little or no added cost.

Inasmuch as the addition of accelerator increases the combustibility and rate of combustion, I have discovered that it is possible to add to the mixture in any given case such an amount or percentage of said accelerator, depending upon the per cent of bonding mineral ingredients present (including that artificially added) as will bring the combustibility or rate of combustion to any desired amount whether the same be equal to or less than or greater than the combustibility of some other fuel with which it may be compared, as for example, one to which there has not been added any accelerator.

In like manner, I have discovered and determined how it is possible to predetermine the amount of accelerator which should be added to raw materials having different percentages of bonding mineral ingredients (including any such ingredients artificially added) in order to produce fuels of a given combustibility.

I have discovered that the retarding of combustion due to the compression to which the material is subjected in the moulds may be either fully or partially or more than fully compensated for by the addition of accelerator, and I have discovered that the combustibility may in any case be restored or brought to a desired amount irrespective of the compression and consequent density, by the addition of the proper percentage of said accelerator as determined by my investigations.

I have also discovered that the fineness of the particles of raw material which should be used bears relation to the percentage of bonding mineral ingredients (including any which may be artificially added) plus the percentage of accelerator used in the mixture and according to the principles which have already been explained herein. For this reason I have discovered that it is possible to select the best degree of fineness of the materials which should be used, such selection being made with reference to, and taking proper account of, all of the other factors of the problem.

The compression exerted upon the material in the moulds and previously referred to herein is the compression which is effective for the purpose of crushing the particles of ingredients together, reducing their size in such act, and closing up the voids. Various kinds of moulds may be used, operating on different principles, but generally speaking, two general classes of moulds are desirable. One may be referred to as the cam type in which the material is subjected to a direct thrust by a plunger or a pair of opposed plungers working in either or both ends of a mould of substantially uniform cross-section; and the other type may be referred to as the open type. This latter includes a plunger working into an entrance of tapering and contracting cross-sectional area down to the body of the mould where the final compression takes place. I have discovered the fact that if the degree of this taper is properly related to the kind of material being used, it is possible to produce a greatly improved moulding action since the effect seems to be to compel the particles to undergo a compressive action from the sides as well as the end thrust of the plunger so that the particles are subjected to additional compressive action over and above the normal direct thrust of the plunger. This total amount of compressive action is estimated as being substantially double that of the direct thrust exerted on the plunger considered by itself.

For the above reason, I prefer to refer to the total compressive force to which the materials are subjected so as to establish a more correct comparison between different moulding operations whether performed in the one type of mould or the other.

In the case of either of the above types of moulds as well as other types, I have found it desirable to make provision for releasing any gaseous or hydrostatic pressure which may be built up in the central portion of the mould as otherwise the block of fuel produced will have a different density and porosity and composition in its central portion as compared to its end portions. By making such provision for release of hydrostatic pressure in the central portion of the mould, as by the provision of a series of small perforations around the medial portion of the mould, I am able to produce blocks which are of uniform density, hardness and composition throughout their entire body.

Referring to the matter of bonding mineral ingredient to be artificially added, I have found that so-called "hydraulic cements" are well adapted to this work and purpose. The percentage of such material actually added, if any, will depend upon the various factors and conditions already explained herein, including the specifications to which the fuel is being made. As an example of a "hydraulic cement" bonding mineral which I have found to be admirably adapted for this work, I may mention the following composition: $SiO_2$, 20.94%; $Fe_2O_3$, 2.09%; $Al_2O_3$, 6.27%; $CaO$, 64.75%; $MgO$, 3.01%; $SO_3$, 1.66%; alkalies, nil; ignition loss 0.87%; these percentages referring only to the composition of the "hydraulic cement" itself. It will be understood, however, that in giving an illustration as above, I do not intend thereby in any sense to limit myself as regards the composition of the bonding material, if any, to be artificially added, except as I may do so within the claims.

It will also be understood that a sufficient amount of "available" moisture must be provided to bring about the hydrating or "setting" of the bonding mineral ingredients under the conditions of operation existing in the practice of the method or process. In many cases, this moisture will be naturally present in the raw materials themselves, as for example in the case of certain peats, lignites, or tan-barks. In some such cases, it may be even necessary or desirable to partially eliminate the moisture by preliminary drying operations.

In other cases it may be necessary to artificially add a certain amount of moisture either by wetting the raw materials or some of them, or by providing such additional moisture in the form of a solution in which some of the constituents are contained. For example, the accelerator such as magnesium chloride may, if desired, be introduced in the form of a water solution in which case the additional moisture will be provided in this manner. In other cases where it is unnecessary to provide additional moisture or where the moisture has been supplied from some other source, the accelerator may be introduced as a powder or in other suitable form, properly intermixed and uniformly distributed throughout the mixture by suitable means. It will be understood that in any case, the total percentage of bonding mineral ingredients present or provided in the mass is relatively small, depending largely upon the specifications to which the fuel is being made. This being the case, a relatively small amount of moisture is all that is required for the bonding action.

I have already explained that the artificial fuel may be made from a very wide selection of carbonaceous materials either in their undistilled or fully or partially distilled form. Thus, for example, use may be made of undistilled coal, (including anthracite, bituminous, and sub-bituminous), peat, lignite, sawdust, tan-bark, and other raw carbonaceous materials containing their volatile constituents. Ordinarily the combustion of these materials is attended with the production of large quantities of smoke and other objectionable distillation products. This can only be regulated to a degree by carrying on the combustion under carefully controlled conditions of draft, air supply, type of furnace, etc. It is one of the important features of the present invention as practiced according to my method and process that artificial fuels produced from undistilled carbonaceous materials which contain their volatile constituents, will burn with practically perfect and complete combustion, and without the production of any smoke or obnoxious gases when once the conditions of combustion have been established. These conditions include the existence of the required amount of air to provide the necessary mixture of oxygen and combustible elements in proportions to permit combustion, the intimacy of mixture and rapidity of mixture of the air and combustible elements and a temperature above the ignition point of the combustible elements in the fuel.

It is a characteristic of artificial fuels made according to my improved method and process that once the proper conditions of combustion have been established, they will burn and continue to burn with a beautiful bluish flame extending out from and surrounding each block of the fuel undergoing combustion, such flame reaching out from its block a distance somewhat dependent upon the size of the block, but averaging approximately one inch to five inches, depending on the size of the block. This blue flame is unattended by any smoke or objectionable vapors or gases which would deposit upon other surrounding objects, and the flame represents a very great intensity of heat, ranging from 1600° F. to 4000° F. depending upon the carbonaceous base used and the amount of draft.

The absence of smoke and the like from fuels made according to my method and process from raw materials including the volatile constituents is due to the fact that the artificial fuel itself is of such a nature that practically complete combustion at the surface of the fuel block is brought about. The generation of smoke and vapors in the combustion of ordinary raw fuels which contain their volatile constituents is in general due to the fact that these volatile constituents and vapors are released in relatively large streams and through relatively large openings or cracks and crevices which form in the blocks of the fuel. Such being the case, it is impossible for the air of combustion to immediately come into contact with the entire body of such a stream of gas or vapor and consequently the combustion of such stream takes place in a relatively slow manner and consequently the hydrogen is first consumed and the carbon is liberated with production of smoke. On the contrary, fuels made according to my method and process are so perfectly bonded and sealed by the accelerator which is used in correctly regulated proportions that the pores of the block of finished artificial fuel are practically sealed up and relatively large openings are thus eliminated. Nevertheless, there exist very minute openings in the bonding material and block through which the volatile gases and vapors are released in very minute and fine streams of enormous number in vapor-like condition. This being the case, the air and oxygen for combustion is able to come into intimate and immediate contact and admixture with all portions of these enormously numerous minute vaporous hydrocarbons so that practically perfect combustion takes place immediately on being released and, at the very surface of the block of fuel. These minute openings affect the density and porosity of the block, so the density and porosity also affects the "rate of combustion".

The combustion of fuels made according to my improved method and process may be termed "surface combustion" since it proceeds entirely from the surface of the blocks of fuel. The constituents of said blocks are so perfectly bonded together that they do not crack or split or open up seams from which the combustion might otherwise proceed, and they are so perfectly bonded together that the combustion is retained on their surfaces, for which reason I am able to characterize them by defining their combustion as being a "surface combustion." This characterization is an inherent result of the production of the blocks under the perfectly regulated conditions, and the perfectly related factors and steps set forth herein.

In order to more clearly and forcefully emphasize the relationship which I have discovered as existing between the different factors and conditions of practice of the method and process and to make it possible to more easily predetermine in any given case the proper conditions and proportions to use in order to produce a fuel of given specifications or characteristics, I have chosen to illustrate said relationships by a series of curves which I will now refer to and explain in detail. For this purpose; In the drawings:—

It will be understood that in these curves the cementing mineral ingredients of the mixture other than magnesium chloride may be composed entirely of natural ingredients, naturally present in the carbonaceous material used whether it be a distilled or undistilled material, or may be partially of such form and partially in the form of cementing mineral ingredients artificially added to the mixture, or may be entirely added. These cementing mineral ingredients naturally present as distinguished from those artifically added comprise those portions of the mineral matter of the carbonaceous material which are capable of exerting a bonding action under the conditions of the operation and as already explained comprise primarily the aluminates and silicates of the natural ash.

Figure 1:
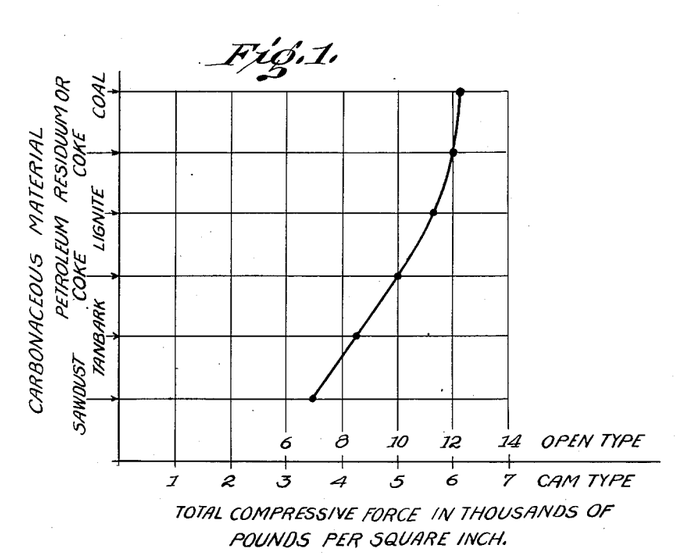
Fig. 1 illustrates a curve showing in a general way the relationship between total compressive force which may be used in the moulds in thousands of pounds per square inch as related to different kinds of raw material for the production of artificial fuel having a combustibility of substantially 100% and a toughness and hardness of substantially 100%, both as measured by the conditions herein elsewhere referred to, and on the assumption that the other factors and their conditions have been properly selected and used.
Figure 2:
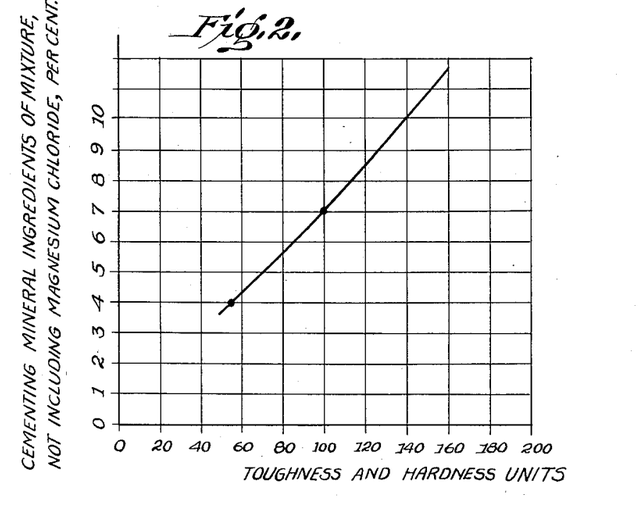
Fig. 2 illustrates a curve showing the relation of toughness and hardness of the artificial fuel as related to the cementing mineral ingredients of the mixture other than magnesium chloride, the toughness and hardness being gauged according to the standards explained elsewhere herein.
Figure 3:
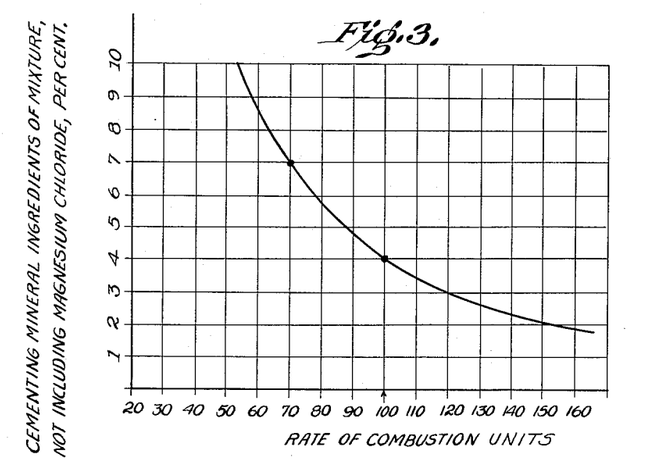
Fig. 3 illustrates a curve showing the relationship between rate of combustion and cementing mineral ingredients of the mixture other than magnesium chloride, the rate of combustion being shown in comparison to the normal rate of combustion for good average fuels of present day practice.

As an illustration of the usefulness of these curves and the features of invention already disclosed herein, let it be assumed that it is desired to produce an artificial fuel from a carbonaceous material having substantially 4% of bonding mineral ingredients therein. Reference to Fig. 3 will show that this material is naturally possessed of a rate of combustion of substantially 100%. Reference to Fig. 2, however, shows that a material of this kind would ordinarily have a toughness and hardness of only approximately 55 units. In order to produce therefrom an artificial fuel having a toughness and hardness of substantially 100 units, Fig. 2 shows that the bonding mineral ingredients of the mixture should be increased to substantially 7%, an addition of substantially 3% of bonding mineral.

Reference again to Fig. 3 shows that upon increasing the bonding mineral ingredients to 7% the rate of combustion would be lowered to approximately 70 units so it is necessary to make compensation for such lowering by recourse to the use of the accelerator.

Figure 4:
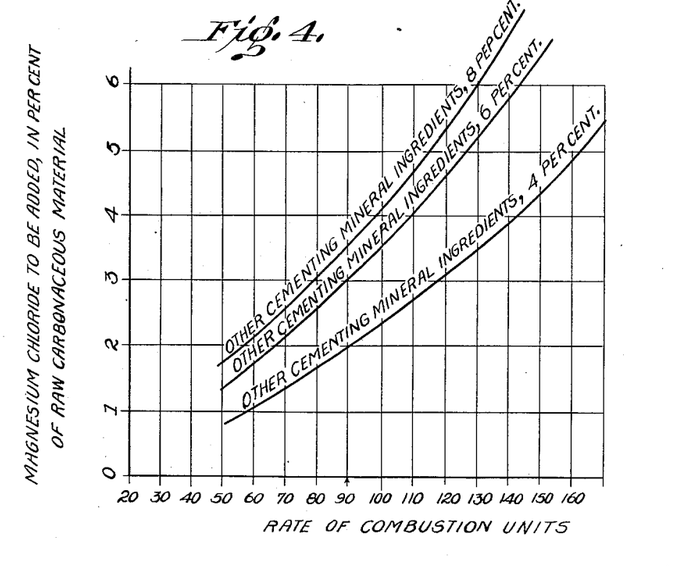
Fig. 4 illustrates three curves showing the relation of rate of combustion to amount of magnesium chloride added to the mixture, the curves being for the three conditions of 4%, 6%, and 8% of cementing mineral ingredients other than magnesium chloride.
Figure 5:
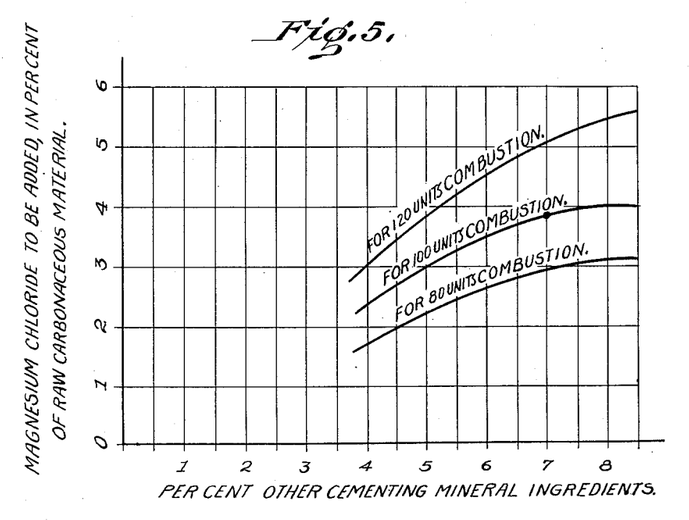
Fig. 5 illustrates three curves showing the relation between percent of cementing mineral ingredients other than magnesium chloride as related to the percent of magnesium chloride which should be added in each case, said curves being for the three conditions of "80 units" combustion, "100 units" combustion, and "120 units" combustion.

Reference to Fig. 4 shows that in order to produce an artificial fuel having a rate of combustion of substantially 100 units from a mix having substantially 7% of bonding mineral ingredient there should be added substantially 3¾% of magnesium chloride. This fact may also be ascertained from Fig. 5 by making use of the central curve which is entitled "For '100 units' combustion".

Figure 7:
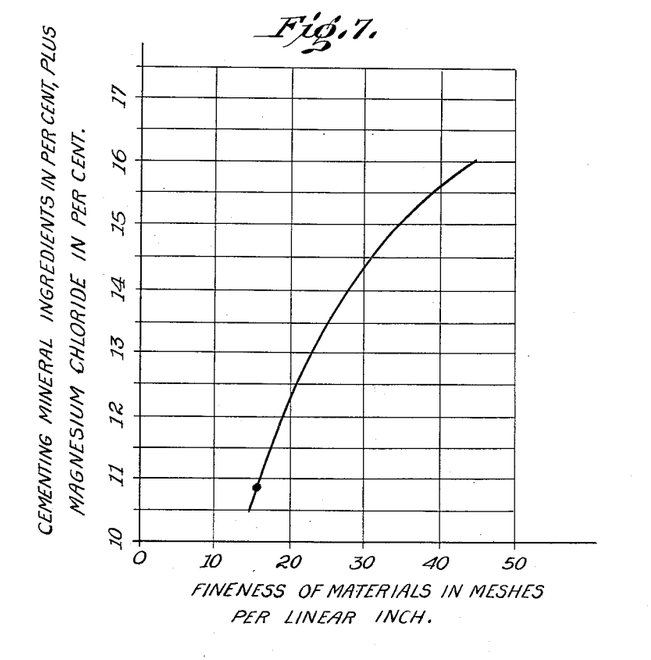
Fig. 7 illustrates a curve showing the relationship between the fineness of materials in meshes per linear inch as compared to cementing mineral ingredients in percent plus magnesium chloride in percent.

Reference to Fig. 7 makes it possible to determine approximately the fineness of the materials which should be used in the mould under the above conditions. For this purpose, the total bonding mineral ingredients plus magnesium chloride, in percent, equals 7 plus 3¾ or 10¾% so that the fineness of the material should be approximately 16–17 meshes per linear inch. It may be remarked in passing, that this factor is not of particularly serious consequence since the materials will be considerably crushed and have their fineness increased by the compression in the mould.

Figure 6:
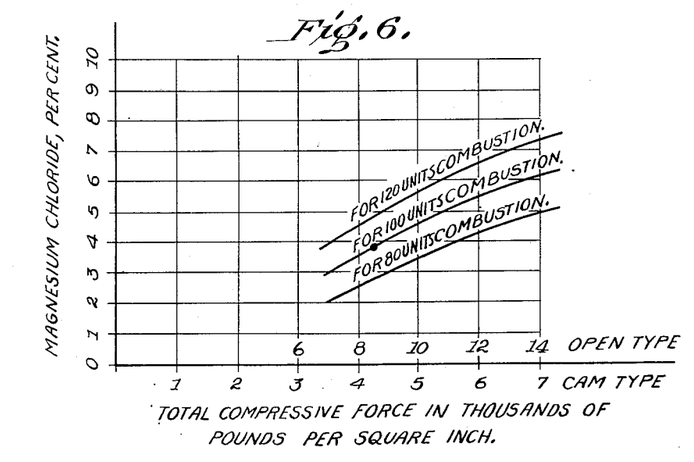
Fig. 6 illustrates three curves showing the relation between total compressive force in the mould in thousands of pounds per square inch as related to the percent of magnesium chloride in the mixture, the three curves being for the conditions of "80 units" combustion, "100 units" combustion, and "120 units" combustion.

From Fig. 6 it is possible to determine the total compressive force which should properly be used in the mould to produce the desired artificial fuel. From inspection of the middle curve of Fig. 6 it is found that the total compressive force corresponding to 3¾% magnesium chloride and using the so-called "open type" of mould should be approximately 8500 pounds per square inch, to give an artificial fuel of "100 units" combustion.

As another illustration of the usefulness of these curves and the features of invention already disclosed hereto, let it be assumed that it is desired to produce an artificial fuel from a carbonaceous material having substantial 6% of bonding mineral ingredients therein, which artificial fuel is to have a toughness and hardness of substantially 110 units and a rate of combustion of substantially 110 units. Reference to Fig. 3 will show that this material is naturally possessed of a rate of combustion of 78 units. Reference to Fig. 2, however, shows that a material of this kind would ordinarily have a toughness and hardness of only approximately 82 units. In order to produce therefrom an artificial fuel having a toughness and hardness of substantially 110 units, Figure 2 shows that the bonding mineral ingredients of the mixture should be increased to substantially 7¾%, an addition of substantially 1¾% of bonding mineral.

Reference to Figure 3 shows that upon increasing the bonding mineral ingredients to 7¾% the rate of combustion will be lowered to approximately 65 units, so it is necessary to make compensation for such lowering by recourse to the use of the accelerator.

Reference to Figure 4 shows that in order to produce an artificial fuel having a rate of cumbustion of substantially 110 units from a mix having substantially 7¾% of bonding mineral ingredient, there should be added substantially 4⅔% of magnesium chloride. This fact may also be ascertained from Figure 5, by use of the two upper curves.

Reference to Figure 7 makes it possible to determine approximately the fineness of the materials which should be used in the mould under the above conditions. For this purpose the total bonding mineral ingredients plus magnesium chloride in per cent equals 7¾% plus 4⅔% or 12.4%, and reference to Figure 7 shows that the fineness of the material should be approximately 20 meshes per linear inch.

From Figure 6 it is possible to determine the total compressive force which should properly be used in the mould to produce the desired artificial fuel. From the upper two curves of Figure 6 it is found that the total compressive force corresponding to 4⅔% magnesium chloride and using the so-called "open type" of mould should be approximately 9200 pounds per square inch to give an artificial fuel of 110 units combustion.

It will be understood that the above illustration is given merely by way of example and that I have provided a method and process which are applicable for the manufacture of artificial fuels to specified characteristics of toughness and hardness, density and porosity, and rate of combustion, from carbonaceous materials of very widely divergent types and widely diversified compositions of mineral content.

The actual rate of combustion of a given fuel such for example as blocks of artificial fuel made according to my method and process will depend of course on the conditions under which the oxidation of such fuel is accomplished. These conditions include the rate of air or oxygen supply, the size of the blocks, the closeness with which the blocks are packed together in the furnace or burner, the size of the fuel bed, the degree of freedom with which the heat is taken away from the furnace, etc. However, it may be said that for certain given conditions of air oxygen supply, size of blocks, closeness of packing the blocks, size of fuel bed and degree of freedom with which the heat is taken away from the furnace, the "rate of combustion" of a given fuel may be compared to that of another fuel, so that a basis of comparison may be established to enable different fuels to be intelligently compared, and a basis of "rate of combustion" to be established.

On the above assumption, the rate of combustion according to the principles herein disclosed may be said to be 100 units when the blocks have substantially 4% cementing mineral ingredient without magnesium chloride; and the rate of combustion will also be 100 units when the blocks have substantially 7% cementing mineral ingredient and 3¾% magnesium chloride and when subjected to substantially 8500 pounds total compressive force in the mould and when the particles of the mix prior to compression in the mould are of a size substantially corresponding to 17 meshes per linear inch. Blocks of other compositions or made according to other specifications will be of either greater or less rate of combustion than 100 units according to the standard of comparison herein assumed.

It will also be understood that the toughness and hardness of the blocks of artificial fuel are chiefly influenced by the percent of cementing mineral ingredient present therein (assuming there is sufficient moisture for proper setting of the same) and will also depend upon the compressive force with which the blocks are formed in the mould. On the above understanding, it may be stated that the blocks will have 100 units toughness and hardness when they have substantially 7% cementing mineral ingredient, 3¾% magnesium chloride (which also brings the rate of combustion to 100 units under the conditions assumed) and are subjected to a total compressive force of substantially 8500 pounds per square inch in the moulds, the fineness of the materials before compression having been that corresponding to substantially 17 meshes per linear inch. The toughness and hardness of other blocks may be compared with blocks made according to the above specification on the assumption that the latter are of 100 units toughness and hardness.

It will also be understood that I am able to produce such artificial fuels to the desired specifications substantially irrespective of the presence or absence of the volatile constituents in the carbonaceous material so used.

I have found that the application of extraneous heat is substantially unnecessary in carrying out or practicing the method and process of this invention, since the artificial fuel is made by what may be termed a "cold process". That is to say, the process differs from any others in the sense that it is unnecessary to especially heat the raw materials or the mixture either prior to or during the carrying forward of the steps of the process. In this connection, however, I have found that as a general proposition, the pressure exerted in the mould during the final or moulding operation will create a substantial increase of temperature of the materials so that in some cases the blocks are delivered from the mould at a temperature of 200–300° F. This increase of temperature is, however, as a general proposition, unnecessary for the conduct of the method and process, and is a mere incident to the compressing operation. It, however, serves to enhance and promote the operation of the bonding ingredients and thereby the hardness of the product. In this connection this elevation of temperature also serves in some instances to vaporize the water with consequent generation of steam which more effectively reaches the bonding mineral ingredients and compels them to set and perform their function more vigorously and efficiently than otherwise.

Figure 9:
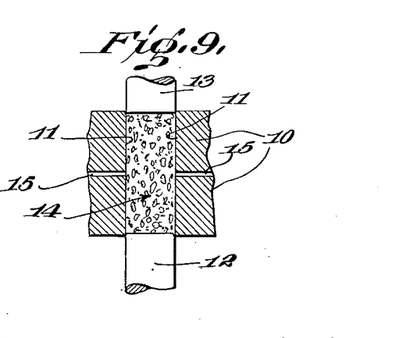

In the cam-type mould of Fig. 9, the mould block 10 is provided with a pocket 11 of substantially uniform cross-section. A plunger 12 works into one end of the mould; and the other end is closed either by a stationary or movable plunger or head 13. In many cases both of the plungers 12 and 13 are forced towards each other to compress the material 14 between them. The mould block 10 is provided around its medial section with a small perforation 15 or a series thereof small enough to prevent the loss of material out through them, but large enough to allow the discharge of gases and air so as to relieve the hydrostatic pressure at the medial plane and insure the production of blocks of uniform structure throughout their entire body.

Figure 8:
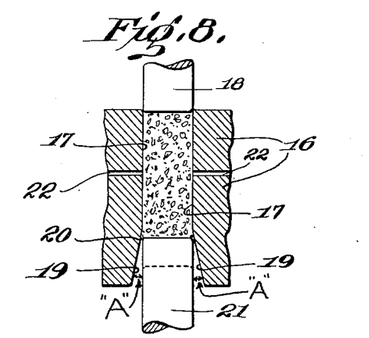
In Fig. 8 I have shown more or less diagrammatically a so-called "open type" mould, in horizontal plane section, and in Fig. 9 I have shown more or less digrammatically a so-called "cam type" mould, in horizontal plane section.

In the "open type" mould of Fig. 8, there is provided a mould block 16 having the pocket 17. One end is provided with either a stationary or movable plunger 18. The other end of the pocket 17 is tapered or flared outwardly as shown at 19 on a given angle of flare or taper down to the point or plane 20 where the pocket 17 becomes of uniform cross-section. The movable plunger 21 works into this flared end of the mould and is of proper size to enter into the pocket 17 of uniform cross-section so as to complete the compressing action therein. The mould 16 is provided with the small opening 22 around its medial section for the function similar to that explained with respect to the openings 15 of the mould of Fig. 9.

With the type of mould shown in Fig. 8, the mould block is filled with the mixture, including all of the ingredients as determined by the disclosures set forth herein and enough of said mixture is placed in the mould to also fill the tapered portion. Then as the plunger 21 moves inwardly from the dotted line position the material of the mixture is forced ahead of the plunger and is also contracted in cross-sectional amount due to the tapering form of the entrance into which it is being forced. As a result, said mixture is subjected to a double amount of compressive force until the plunger 21 finally reaches the inner end of the tapered section. This form of mould therefore is especially desirable and effective in its functions.

I have found by an extended series of experiments that the amount of this taper of the entrance portion of the so-called "open type" of mould bears an important relation to the production of the blocks of artificial fuel from different kinds of carbonaceous material. Thus, for example, the following angles of taper of the entrance portion of the mould and as shown in the angle "A" of Fig. 9 have been found to be satisfactory. For the case of sawdust, an excellent fuel was made according to my method and process with an angle "A" on each side of approximately ⅜" width in a length of 5"; in the case of tan-bark, with an angle of approximately ⅔" in a length of 5"; in the case of petroleum coke, with an angle of approximately ⅔" in a length of 5¼"; in the case of lignite, with an angle of approximately ⅜" in a length of 5¾"; in the case of residuum or coke with an angle of approximately ⅜" in a length of 6"; and in the case of coal with an angle of approximately ⅜" in a length of 6¼". Dividing the width of taper at each side of the opening by the length of such taper we find that the ratio or percent of taper on each side of the tapered section varies between 4.75% in the case of petroleum coke and 7½% in the case of sawdust; in the case of tan-bark it is 5%; in the case of lignite it is 6½; in the case of residuum or coke it is 6¾%; and in the case of coal it is 6%. It will be noted that due to this taper in the throat of the mold there is a double reduction of bulk of the material. There is a reduction in a primary direction which is the direction of plunger movement and a reduction in a secondary direction at right angles thereto which is due to the taper. This secondary reduction is of percentage double in amount the percentages just above referred to. That is, in the case of petroleum coke 9½ percent, in the case of sawdust it is 15 percent, in the case of tan-bark it is 10 percent, in the case of lignite it is 13 percent, in the case of residuum or coke it is 12½ percent, and in the case of coal it is 12 percent. These angles have been found to produce excellent commercial fuels according to my method and process; but I do not limit myself to these or any other angles except as I may do so in the claims.

It will also be noted that I have established and disclosed herein the factors affecting the toughness and hardness of the artificial fuel, as well as the rate of combustion thereof; and in this connection that I have ascertained and disclosed herein the existence and relationship of the factors of bonding mineral ingredients (thereby also showing what percent or amount thereof, if any, should be added to supplement that which is naturally present); accelerator to be added, total compressive force to be used, and fineness of materials proper or desirable to use, all as related to each other and as affecting the toughness and hardness, density and porosity, and also the rate of combustion of the final artificial fuel product.

I claim:

1. A method and process for the production of blocks of artificial fuel of predetermined toughness and hardness, density and porosity, and rate of combustion from comminuted carbonaceous base material having ash, including cementing mineral ingredient, which consists in incorporating with said carbonaceous base material an additional cementing mineral ingredient to increase the toughness and hardness of the product, said cementing mineral ingredient having a combustion retarding action, and which consists in incorporating with the mixture magnesium chloride having combustion accelerating action, and which consists in reducing the size of the particles of said mixture in an amount proportional to the total amount of cementing mineral ingredient plus magnesium chloride present therein, and which consists in providing within the mixture an amount of available moisture sufficient to set the cementing mineral ingredients, and which consists in subjecting the mixture to a total compressive force in amount proportional to the percent of magnesium chloride present in the mixture and the rate of combustion, the amount of magnesium chloride present in the mixture being sufficient to overcome retardation of combustion due both to cementing mineral ingredient and also due to compression in the mould and to accelerate the rate of combustion of the blocks of artificial fuel to a rate of combustion at least equal to that of the raw carbonaceous base material, substantially as described.

2. A method and process for the production of artificial fuels of specified toughness and hardness, density and porosity, and rate of combustion from comminuted carbonaceous materials, which consists in associating with the carbonaceuos materials such amount of cementing mineral ingredient, if any, as necessary to insure the presence of a specified amount thereof in the mixture with consequent toughness and hardness in the artificial fuel, and which consists in incorporating in the mixture an amount of magnesium chloride corresponding to the total amount of cementing mineral ingredients including any of such ingredients artificially added, and which consists in subjecting the mixture to the compression in an amount corresponding to the magnesium chloride present in the mixture and the density and porosity and rate of combustion of the artificial fuel, the magnesium chloride being present in amount proportional to total cementing mineral ingredient and compression to accelerate the rate of combustion to a rate of combustion definitely related to that of the raw carbonaceous material, there being a sufficient amount of available moisture present in the mixture for the purpose of setting the cementing mineral ingredients including any such ingredients artificially added to the mixture, substantially as described.

3. A method and process for the production of artificial fuel of specified characteristics including density and porosity, and rate of combustion from comminuted carbonaceous material, which consists in ascertaining the amount of bonding ingredient in the carbonaceous material, introducing into the carbonaceous material an amount of accelerating chemical depending upon the percent of such bonding ingredient and the rate of combustion of the fuel to be produced, and subjecting the mixture to compression in amount depending upon the amount of accelerating chemical present in the mixture and the rate of combustion of the fuel to be produced, there being sufficient available moisture present in the mixture to set the bonding ingredient, substantially as described.

4. A method and process for the production of artificial fuels of prescribed toughness and hardness, density and porosity, and rate of combustion, which consists in producing a mixture of comminuted carbonaceous material having a definite total amount of bonding ingredient ascertained to be correct corresponding to the desired toughness and hardness, and an amount of accelerator of combustion definitely corresponding to the amount of bonding ingredient present to produce the desired rate of combustion, and subjecting said mixture to compression in an amount definitely corresponding to the amount of such accelerating chemical present in the mixture and the desired rate of combustion of the fuel to be produced, the particles of the mixture prior to compression being of a size definitely proportioned to the amount of cementing ingredient plus accelerating chemical present in the mixture, substantially as described.

5. In the art of producing artificial fuels of specified characteristics including rate of combustion from comminuted carbonaceous materials including bonding ingredient which retards combustion, that step which consists in introducing into the mixture including said carbonaceous material including bonding ingredient, chemical accelerator of combustion in amount in definite proportion to the proportion of bonding ingredient to thereby compensate to a definite degree for the combustion retarding action of the bonding ingredient, and produce the specified rate of combustion, substantially as described.

6. A method and process for the production of blocks of artificial fuel from comminuted carbonaceous material which blocks of artificial fuel are firmly bonded together and have a toughness and hardness and a rate of combustion of at least substantially one hundred units compared with the normal for such carbonaceous material, which method or process includes the introduction into the carbonaceous material of bonding mineral ingredient in such amount if necessary as to insure the presence of at least substantially seven percent in the mixture and the introduction of chemical accelerator of combustion to the amount of at least substantially three and three-fourths percent in the mixture and which consists in insuring the presence of substantially sufficient available moisture in the mixture to insure setting of the bonding mineral ingredients, and which consists in subjecting the mixture to a total compressive force in amount proportional to the percent of accelerator of combustion present in the mixture and the rate of combustion, substantially as described.

7. The hereindescribed method and process for the production of blocks of artificial fuel from comminuted carbonaceous material which consists in determining the proportion of bonding ingredient naturally present therein, then supplementing the same by addition thereto of such an amount of artificial bonding ingredient, if any, as necessary to produce in the mixture a total amount thereof determined from curve two for the desired toughness and hardness in the blocks to be produced, incorporating in the mixture such an amount of chemical accelerator of combustion as determined from curve four for the desired rate of combustion in the blocks to be produced and corresponding to the amount of bonding ingredient in the mixture, and then subjecting the mixture to compression in an amount determined from curve six for the percent of chemical accelerator of combustion and the desired rate of combustion in the completed blocks, substantially as described.

8. A method and process for producing blocks of artificial fuel from comminuted carbonaceous material which consists in producing a mixture of said carbonaceous material having a definite percentage of bonding ingredient together with a percentage of chemical accelerator of combustion definitely related to the percentage of bonding ingredient aforesaid to compensate for the combustion retarding action of the bonding ingredient in definite degree, and which consists in subjecting said mixture to compression to reduce its bulk in a primary direction and also to simultaneously reduce its bulk in a secondary direction at right angles thereto, the reduction in bulk in the secondary direction being substantially between $9\frac{1}{2}\%$ and $15\%$ of the reduction in bulk in the primary direction substantially as described.

9. A method and process for producing blocks of artificial fuel from residuum which consists in producing a mixture of said residuum having a definite percentage of bonding ingredient together with a percentage of chemical accelerator of combustion definitely related to the percentage of bonding ingredient aforesaid to compensate for the combustion retarding action of the bonding ingredient in definite degree, and which consists in subjecting said mixture to compression to reduce its bulk in a primary direction and also to simultaneously reduce its bulk in a secondary direction at right angles thereto, the reduction in bulk in the secondary direction being substantially $12\frac{1}{2}\%$ of the reduction of bulk in the primary direction, substantially as described.

ARTHUR A. ROBERTS.